June 30, 1936.  G. H. GRAHAM  2,045,771

EGG TRAY

Filed March 16, 1934  2 Sheets-Sheet 1

Inventor:
George H. Graham
By: Wilkinson, Huxley, Byron & Knight
attys.

June 30, 1936.　　G. H. GRAHAM　　2,045,771
EGG TRAY
Filed March 16, 1934　　2 Sheets-Sheet 2
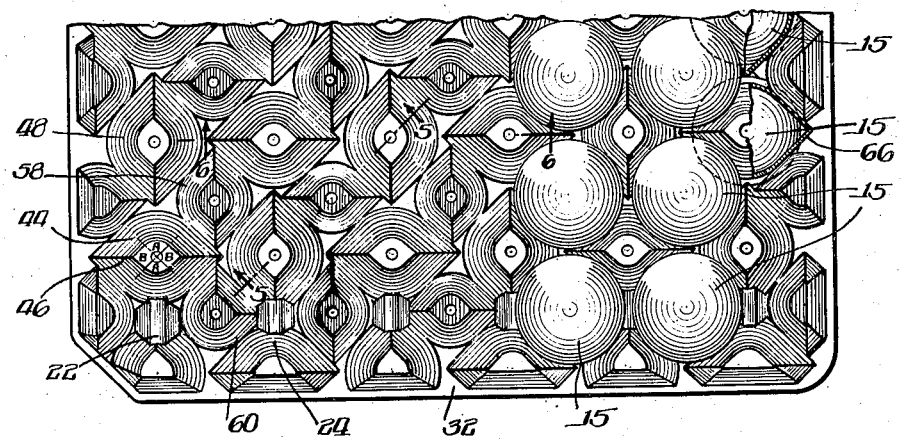
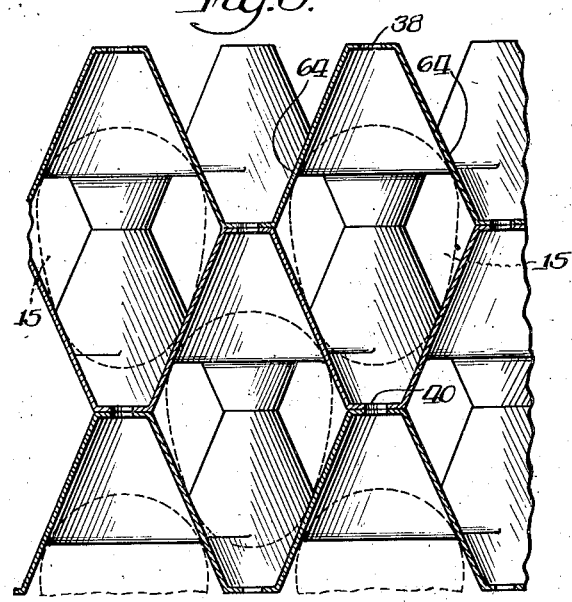 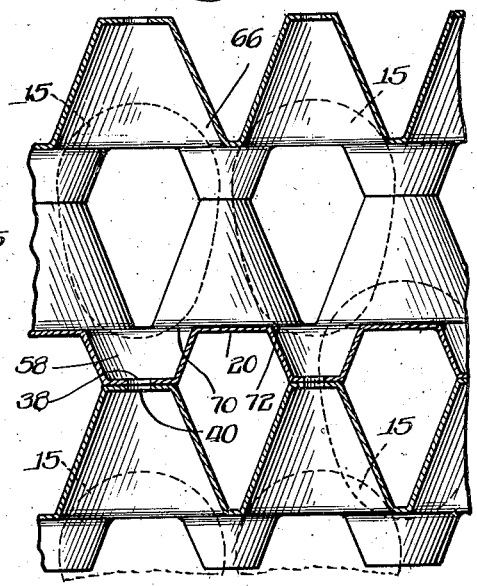
Inventor:
George H. Graham
By: Wilkinson, Huxley, Byron & Knight
attys.

Patented June 30, 1936

2,045,771

UNITED STATES PATENT OFFICE 2,045,771

EGG TRAY

George H. Graham, Chicago, Ill., assignor to Orenda Corporation, Chicago, Ill., a corporation of Illinois Application March 16, 1934, Serial No. 715,863

4 Claims. (Cl. 217—26.5)

This invention relates to egg trays for packing eggs in crates, and has been illustrated as embodied in egg trays of such character as to be stacked one on top of another, and which, when so arranged, eliminate the necessity for vertically extending spacers, generally called fillers. According to the present invention such egg trays are constructed in such manner as to adequately ventilate the case, the essential principle being to eliminate all pockets which are sealed or partially sealed by the egg itself.

In the past egg trays have been used which were constructed in accordance with Figure 1, except that they were imperforate, whereas that of Figure 1 is perforated with ventilating holes. Such egg trays being very cheaply formed were considered very desirable until it was found that the eggs spoiled much faster than they should have. If the eggs were properly packed and kept right side up, and if the egg trays retained their original shape, the eggs should keep all right in theory, but the fact remains that the eggs did not keep as they should have. I have decided that the reason for this is that each egg projects into a pocket which is closed on all but one side, and that due to one cause or another the eggs would settle into the one open side of the pocket, thereby closing or substantially closing the pocket so that circulation of the air around the end of the egg was either cut off or so restricted as to be insufficient. Under such conditions mold may form on the portion of the eggshell enclosed by the pocket. It is therefore the object of the present invention so to construct the egg trays that such sealing or substantial sealing of the ends of the eggs will be impossible, and so that regardless of packing and treatment, the egg will inevitably receive enough air to prevent deleterious effects such as the formation of mold.

It is a secondary object of the invention to so construct the egg trays in an economical manner that under any ordinary treatment the eggs will be sufficiently ventilated.

With these and various other objects in view, the invention may consist of certain novel features of construction and operation, as will be more fully described and particularly pointed out in the specification, drawings and claims appended hereto.

In the drawings, which illustrate an embodiment of the device, and wherein like reference characters are used to designate like parts, Figure 1 is a plan view of one form of egg tray made in accordance with this invention;

Figure 4 is a fragmentary plan view of a modification of the invention;

Figure 5 is a fragmentary section taken on the line 5—5 of Figure 4 of a plurality of egg trays of Figure 4 properly assembled; and Figure 6 is a fragmentary section taken along the line 6—6 of Figure 4 showing a different view of the assembly shown in Figure 5.

Figure 1:
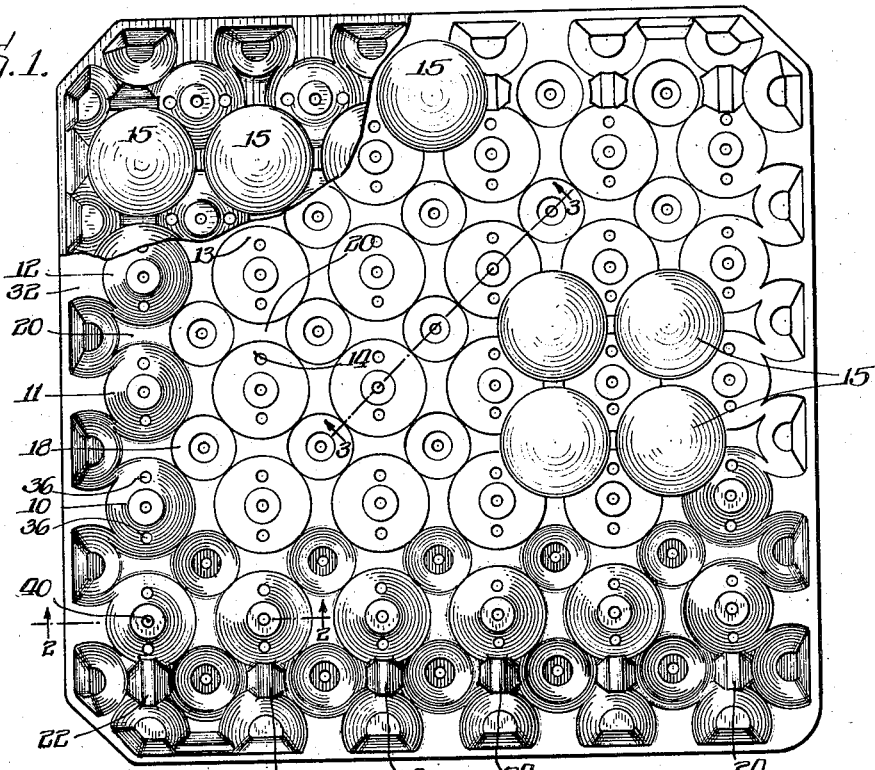
Figure 2:
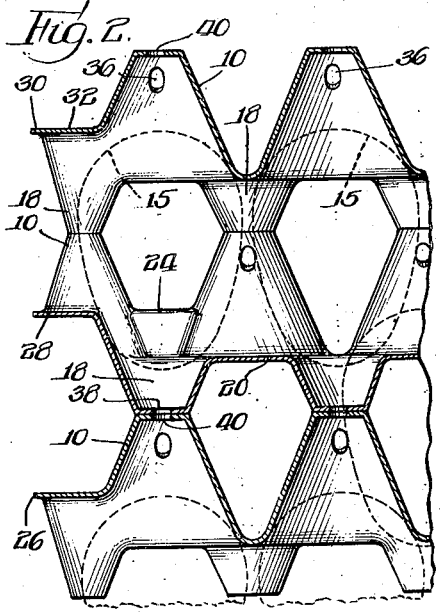
Figure 2 is a fragmentary section along the line 2—2 showing a plurality of these egg trays properly assembled and indicating the presence of the eggs therein, the central egg tray of this picture showing the section along the line 2'—2' of Figure 1.
Figure 3:
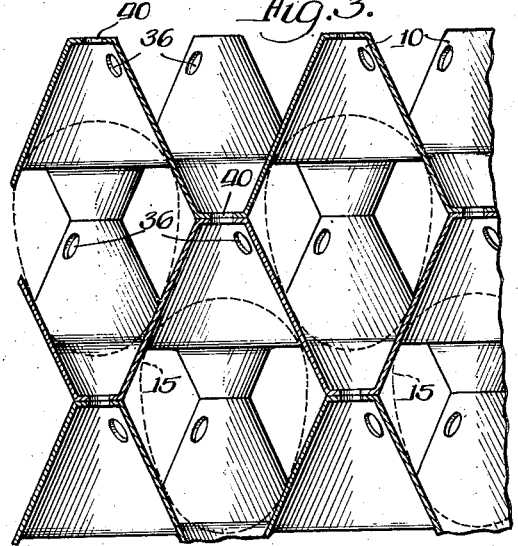
Figure 3 is a fragmentary section along the line 3—3 showing a different view of the assembly of Figure 2.

Although my invention may take many forms only two have been chosen for illustration. Figures 1, 2 and 3 show the egg tray as it has been heretofore sold and used with the exception that certain ventilating holes have been added. The structure will therefore first be described without reference to the ventilation.

The egg tray comprises a molded sheet-like member formed from wood pulp or other paper pulp, and is of approximately the quality of cardboard from which the well known paper plates are made. In shape it comprises essentially a plurality of formations 10, each of which is a hollow frustum of an upwardly pointed cone. These cones are arranged in perpendicular rows. Thus 4 of the cones, which for convenience we may number 11, 12, 13 and 14 may be considered as located at the corners of a square and they should be so spaced as to form four tapered pillars between which and onto which an egg may be rested, as the eggs 15 are rested between other such pillars.

Positioned at the center of each group of four such pillars is a pocket 18 which may be of inverted frusto-conical shape. In the space between each two adjacent pillars 13 and 14 for example is a connecting web 20 which also is a connecting web between two adjacent pockets 18. These connecting webs are for the most part located at such level as not to be contacted by the eggs. In other words, the egg normally rests on the sloping sides of the four pillars and does not contact the pocket 18. In some instances the web 20 may have a raised portion 22 or 24 forming a high bridge between its adjacent pillars 10 for the purpose of increasing the structural strength of the tray. In the arrangement illustrated, the bridges 24 are of approximately the height illustrated in the middle egg tray of Figure 2, and the bridges 22 are higher than by about one-third the distance between the bridges 24 and the top of the pillar.

In use, one egg tray is placed in the crate, say the bottom egg tray in Figure 2, which may be numbered 26 for convenience, whereupon an egg is inserted in each space that is surrounded by four pillars. Another egg tray, which for convenience is numbered 28, is then placed on the top of the egg tray 26, being turned a quarter revolution with respect thereto. Due to the spacing of the pillars and pockets as shown in Figure 1 this results in the pocket 18 of the egg tray 28 resting on the pillars 10 on the egg tray 26. The pockets 18 therefore are not only pockets as seen from the top, for as seen from the bottom they are also legs. The upper part of each egg resting on the pillars 10 of the lower tray 26 fits into a pocket formed by the under side of the pillars 10 of the egg tray 28. When the egg has been inserted in each of the spaces between four pillars on egg tray 28 another egg tray which may be numbered 30 is placed on top of egg tray 28, the egg tray 30 being in the same angular position as the egg tray 26 so that it is turned ninety degrees with respect to the egg tray 28. The pockets or legs 18 of the egg tray 30 therefore rest on the pillars 10 of the egg tray 28 and likewise the cones or pillars 10 of the egg tray 30 lie over the eggs carried by the egg tray 28. This is clearly shown in Figure 2.

In the past it was preferred that the eggs 15 be inserted with their small ends down, in which case they will sit low enough so that they will not ordinarily contact the cone 10 of the egg tray above them. It would therefore be possible for air to circulate between the egg and the superimposed egg tray, and ventilate the top of the egg. As explained previously, the web 20 is sufficiently low so that the egg does not contact it, and it would therefore be possible for air to circulate between the egg 15 and the web 20 to ventilate the lower end of the egg. In practice, however, this theoretical ventilation is not maintained. Sometimes the egg is put in with the wrong side up, with the result that it stands higher than if it were right side up, and if it is a large egg it may press against the superimposed cone 10, which will be substantially sealed by the egg so that there may be insufficient circulation of air around the upper end of the egg. Sometimes also the entire egg crate will be turned upside down, in which case the eggs will settle onto the cone 10 and substantially seal themselves in with the same fatal effect. It is also possible for the eggs to settle down into the pockets 18 (if the egg is small and if the egg tray gets damp and soft), in which case the circulation of air may be shut off from the lower end, or so nearly so as to cause spoilage.

It should be explained that the foregoing discussion of insufficient ventilation was on the assumption that there are no ventilating holes such as are shown in the drawings, these ventilating holes being provided by the present invention. It should also be noted that these difficulties apply mainly to the eggs other than those at the periphery, since such eggs as are located at the periphery may be ventilated by reason of the fact that the flange 32 and likewise the bridges 22 and 24 are high enough along the walls of the cones 10 so that ordinarily the cones would not be contacted at such points, and there would be room for the circulation of air between said points and the egg. However, even such conditions sometimes proved inadequate apparently because a single small opening does not furnish sufficient ventilation, and perhaps also because in some instances even such small opening was closed or substantially closed.

In order to better illustrate the ventilation here provided the eggs have been shown as if they sealed up the superimposed cones 10, even though in practice they would not ordinarily do so unless the crate were turned upside down. It is when they do do so either completely or substantially, or when they substantially seal up the underlying pockets 18 that ventilation is necessary. The inside of the cones 10 may be adequately ventilated by providing two holes 36 on two sides of the cone. These holes have been shown as having a vertical axis so that they may be formed by vertical punches or by vertical projections in the forming mold. The provision of these two holes on the sides of the cones will be sufficient for the ventilation of the cones, and in many cases no further ventilation will be needed anywhere in the egg tray. As a matter of fact, a single hole will usually be sufficient for the cones located around the periphery, since as previously discussed one circulation opening is provided between the egg and the flange 32 or the bridges 22 or 24.

It is preferred, however, to provide sufficient ventilation for the more extreme conditions, and therefore the two openings are provided even on the peripheral cones, and also provision is made for further ventilation of the pockets 18. For this purpose it would of course be possible to provide two openings similar to those on the sides of the cones 10, but it is preferred to provide a single opening 38 at the bottom of each of the pockets 18 and in addition a similar opening 40 at the top of each of the cones 10. If desired an additional opening may be provided in the side wall of each pocket 18. Inasmuch as the egg is normally held out of contact with the pocket 18, however, it is believed that the additional opening will rarely be necessary, since the openings 38 and 40, especially together with the openings 36 will permit free circulation of air through the pocket 18 at least if there is even a small space between the egg and the web 20.

A modification of this invention is shown in Figures 4, 5 and 6. This form does not require the presence of any holes on the sloping sides of the pillars or pockets, and is therefore probably preferable from a manufacturing standpoint in cases where new forming dies are to be made. The structure of Figures 1 to 3 is preferred where the dies are already in existence, or for stock on hand which needs to be made over.

According to the modification, however, the means of ventilation mainly relied upon is irregularity in the shape of the cones and of the pockets. The cones or pillars instead of being frustrums of true cones are boat-shaped, being angular along two sides, as illustrated. Thus the pillar 44 though having a true frusto-conical shape within substantially the angles A is shaped more like a pyramid in the angles B. The egg being round, engages the inside of the walls of the pillar in the zones falling in angles A just as an egg fits the inside of the truly conical pillars 10 of Figure 1. However, in the zones within angles B the walls of the pillar 44 recede from the egg, reaching the maximum distance from the egg along the corners 46 of the pillars. For the sake of clarity these corners have been illustrated as if they were sharp, but in actual practice they would naturally be rounded to facilitate their formation.

It will be noticed that each pair of adjacent pillars are extended in transverse directions with respect to one another. Thus the pillar 44 is extended from right to left, and the pillar 48 from top to bottom of Figure 1. This makes it possible for each pillar to be extended further than it could if the pillar toward which it were extended were likewise extended toward it. It also tends to make the egg tray a little bit stronger, since along the center line of any particular row of pillars some of the pillars would be conical in shape and others pyramidal, and therefore the flexing actions of the adjacent pillars would be somewhat different.

The pockets 58 between any four adjacent pillars are similarly elongated on one or two sides. All the pockets except the pockets 60 near the bridges 22 and 24 are preferably elongated on opposite sides, the adjacent pockets being elongated in transverse directions with respect to one another as in the case of the pillars. The pockets 60 may be varied in any of the manners shown on account of the presence of the bridges 22 and 24, and because the presence of the flange 32 may make an extension of the pocket in this direction undesirable.

In these figures, as in Figures 1 and 3, the eggs have been shown as if the top of the eggs would contact the pillars thereabove, although as has been said, the eggs normally would not fit so tightly, but under the assumption of tight fitting eggs, if we look at a cross-section along the diagonal line 5—5, we see from Figure 5 that the eggs are supported by the pillars therebelow, and if the crate were turned upside down each egg would be supported by contacting the inside of one of the pillars at the points 64. However, as we see from Figure 6, the elongated portion of each pillar would be spaced from the egg as at points 66 so that there would be two points, one on either side of the egg, through which air could circulate to ventilate that end of the egg. Likewise the clearance between the webs 30 and between the pockets 58 is greater at the point 70 where the pocket is elongated than at the point 72 where the pocket is not elongated. The spacing at 72 corresponds to the normal spacing in the form shown in Figure 1, and so it is seen that even if the egg is jostled down to the extent that it contacts at the point 72 there would still be clearance at the point 70. To still further eliminate any possibility of insufficient ventilation, an opening 38 is provided in the bottom of each of the pillars and an opening 40 in the top of each of the pockets. This not only overcomes the danger of insufficiency of ventilation of each egg, but also aids the passage of air from one layer of eggs to another, so that the circulation of air in the crate as a whole is facilitated.

It may be explained in general that it is somewhat difficult to know just how many of the ventilating provisions made will prove to be necessary. It seems fairly certain that all of those provided in the form of Figures 4 to 6 will be sufficient and probably those provided in Figures 1 to 3. In the forms shown in Figures 4 to 6 it is believed that the openings 38 and 40 may be omitted for the sake of economy in formation, as in the event that the forming dies should prove ineffective as to the holes, or troublesome, and require that an extra hole forming step be included in the process of manufacture. It is also desired to omit these holes as soon as possible to remove any possibility that the contents of a broken egg would flow through such holes onto the egg below. In general it may be said that one of the important features of this invention is to provide two openings for every pocket that would otherwise be sealed or substantially sealed, and in this connection it should be pointed out that the inside of the pillars may be called a pocket just as may the pockets 58. The two openings may be insured by any irregularity of a dependable type and degree, or by holes through the tray, or by any combination of these. At the present time it is preferred that the ventilation be so complete as to eliminate the possibility of trouble, and three openings are provided for, but tests over a long period of time will naturally show that some of the ventilation may be dispensed with, and this invention therefore contemplates the provision of any of the disclosed ventilating means or any equivalent thereof either alone or in combination.

What is claimed is:

1. An egg tray formed of molded pulp and having on its upper side a plurality of hollowed tapered pillars arranged in rows; tapered depressions centered among groups of said pillars and adjoining them and having walls which are substantially continuations of the walls of said pillars where the pillars and depressions adjoin one another, each group of said pillars and associated depressions being so shaped and spaced as to form a seat for an egg for supporting the egg by contact of said seat with spaced points on the egg near its lower end; the insides of said upstanding pillars forming on the other side of said tray when the tray is inverted tapered egg receiving pockets each having side walls so spaced as to support an egg by contacting with the egg near its lower end; said tray being so shaped that when it is rested on another such tray with respect to which it is turned at right angles the said depression of the upper tray rests on the said pillars of the lower tray and the pockets on the bottom of the upper tray are positioned above the seats on the lower tray to receive the upper ends of the eggs on said lower tray, said trays being substantially spaced apart at substantially all points except where said pillars and depressions contact, whereby air may circulate freely between said trays and around the portions of the eggs therebetween, said pockets and depressions being distinctly noncircular in horizontal cross-section to prevent an egg from sealing closed the ends thereof.

2. An egg tray formed of molded pulp and having on its upper side a plurality of hollowed tapered pillars arranged in rows; tapered depressions centered among groups of said pillars and adjoining them and having walls which are substantially continuations of the walls of said pillars where the pillars and depressions adjoin one another, each group of said pillars and associated depressions being so shaped and spaced as to form a seat for an egg for supporting the egg by contact of said seat with spaced points on the egg near its lower end; the insides of said upstanding pillars forming on the other side of said tray when the tray is inverted tapered egg receiving pockets each having side walls so spaced as to support an egg by contacting with the egg near its lower end; said tray being so shaped that when it is rested on another such tray with respect to which it is turned at right angles the said depression of the upper tray rests on the said pillars of the lower tray and the pockets on the bottom of the upper tray are positioned above the seats on the lower tray to receive the upper ends of the eggs on said lower tray, said trays being substantially spaced apart at substantially all points except where said pillars and depressions contact, whereby air may circulate freely between said trays and around the portions of the eggs therebetween, said pockets and depressions each having two channels extending therein formed by angular bulges in its wall.

3. An egg tray formed of molded pulp and having on its upper side a plurality of hollowed tapered pillars arranged in rows; tapered depressions centered among groups of said pillars and adjoining them and having walls which are substantially continuations of the walls of said pillars where the pillars and depressions adjoin one another, each group of said pillars and associated depressions being so shaped and spaced as to form a seat for an egg for supporting the egg by contact of said seat with spaced points on the egg near its lower end; the insides of said upstanding pillars forming on the other side of said tray when the tray is inverted tapered egg receiving pockets each having side walls so spaced as to support an egg by contacting with the egg near its lower end; said tray being so shaped that when it is rested on another such tray with respect to which it is turned at right angles the said depression of the upper tray rests on the said pillars of the lower tray and the pockets on the bottom of the upper tray are positioned above the seats on the lower tray to receive the upper ends of the eggs on said lower tray, said trays being substantially spaced apart at substantially all points except where said pillars and depressions contact, whereby air may circulate freely between said trays and around the portions of the eggs therebetween, said pockets and depressions including passages to their inner ends for the circulation of air to the ends of the eggs therein, said pockets and depressions each having two channels extending therein formed by angular bulges in its wall, and said contacting pillars and depressions having aligned holes therethrough for the passage of air through the trays.

4. An egg tray formed of molded pulp and having on its upper side a plurality of hollowed tapered pillars arranged in rows; tapered depressions centered among groups of said pillars and adjoining them and having walls which are substantially continuations of the walls of said pillars where the pillars and depressions adjoin one another, each group of said pillars and associated depressions being so shaped and spaced as to form a seat for an egg for supporting the egg by contact of said seat with spaced points on the egg near its lower end; the insides of said upstanding pillars forming on the other side of said tray when the tray is inverted tapered egg receiving pockets each having side walls so spaced as to support an egg by contacting with the egg near its lower end; said tray being so shaped that when it is rested on another such tray with respect to which it is turned at right angles the said depression of the upper tray rests on the said pillars of the lower tray and the pockets on the bottom of the upper tray are positioned above the seats on the lower tray to receive the upper ends of the eggs on said lower tray, said trays being substantially spaced apart at substantially all points except where said pillars and depressions contact, whereby air may circulate freely between said trays and around the portions of the eggs therebetween, said pockets and depressions including passages to their inner ends for the circulation of air to the ends of the eggs therein, said pockets and depressions each having two channels extending therein formed by angular bulges in its wall, and said bulges on the various adjacent pillars or depressions being respectively staggered in angular position to avoid conflict or contact between bulges.

GEORGE H. GRAHAM.